(12) United States Patent
Spahlinger et al.

(10) Patent No.: US 10,254,116 B2
(45) Date of Patent: Apr. 9, 2019

(54) DEVICE AND METHOD FOR PROCESSING OF RESIDUAL VALUES WHEN CONTROLLING A SENSOR

(71) Applicant: NORTHROP GRUMMAN LITEF GMBH, Freiburg (DE)

(72) Inventors: Guenter Spahlinger, Stuttgart (DE); Steffen Zimmermann, Teningen (DE)

(73) Assignee: NORTHROP GRUMMAN LITEF GmbH (DE)

( * ) Notice: Subject to any disclaimer, the term of this patent is extended or adjusted under 35 U.S.C. 154(b) by 0 days.

(21) Appl. No.: 15/557,359

(22) PCT Filed: Nov. 27, 2015

(86) PCT No.: PCT/EP2015/077952
§ 371 (c)(1),
(2) Date: Sep. 11, 2017

(87) PCT Pub. No.: WO2016/142015
PCT Pub. Date: Sep. 15, 2016

(65) Prior Publication Data
US 2018/0252525 A1    Sep. 6, 2018

(30) Foreign Application Priority Data

Mar. 12, 2015 (DE) .......... 10 2015 003 196

(51) Int. Cl.
*G01C 19/5649* (2012.01)
*G01C 19/5776* (2012.01)
(Continued)

(52) U.S. Cl.
CPC ..... *G01C 19/5649* (2013.01); *G01C 19/5635* (2013.01); *G01C 19/5656* (2013.01); *G01C 19/5776* (2013.01)

(58) Field of Classification Search
CPC ............ G01C 19/5649; G01C 19/5635; G01C 19/5656; G01C 19/5614; G01C 19/5621; G01C 19/5719; G01C 19/5726
(Continued)

(56) References Cited

U.S. PATENT DOCUMENTS 5,764,171 A    6/1998  Stikvoort
2013/0279717 A1  10/2013  Reimann et al.

FOREIGN PATENT DOCUMENTS

CN    1320207 A    10/2001
CN    103988051 A    8/2014
(Continued)

OTHER PUBLICATIONS

Chinese Search Report corresponding to Chinese Application No. 201580077626.5, dated Apr. 18, 2018.
(Continued)

*Primary Examiner* — Robert R Raevis
(74) *Attorney, Agent, or Firm* — Tarolli, Sundheim, Covell & Tummino LLP

(57) ABSTRACT

The invention relates to a device (300) for controlling a sensor (310), comprising a converter unit (320) for converting an input signal (365) into a control signal (360) for controlling said sensor (310), and a comparison unit (330) for determining a differential signal (370) that indicates the difference between said input signal (365) and control signal (360). The device also comprises a feedback unit (340) for regulating the input signal (365) using said differential signal (370). A differential signal (370) transfer function has a zero point at a sensor (310) operating frequency which does not equal zero.

12 Claims, 11 Drawing Sheets

Figure 2A:
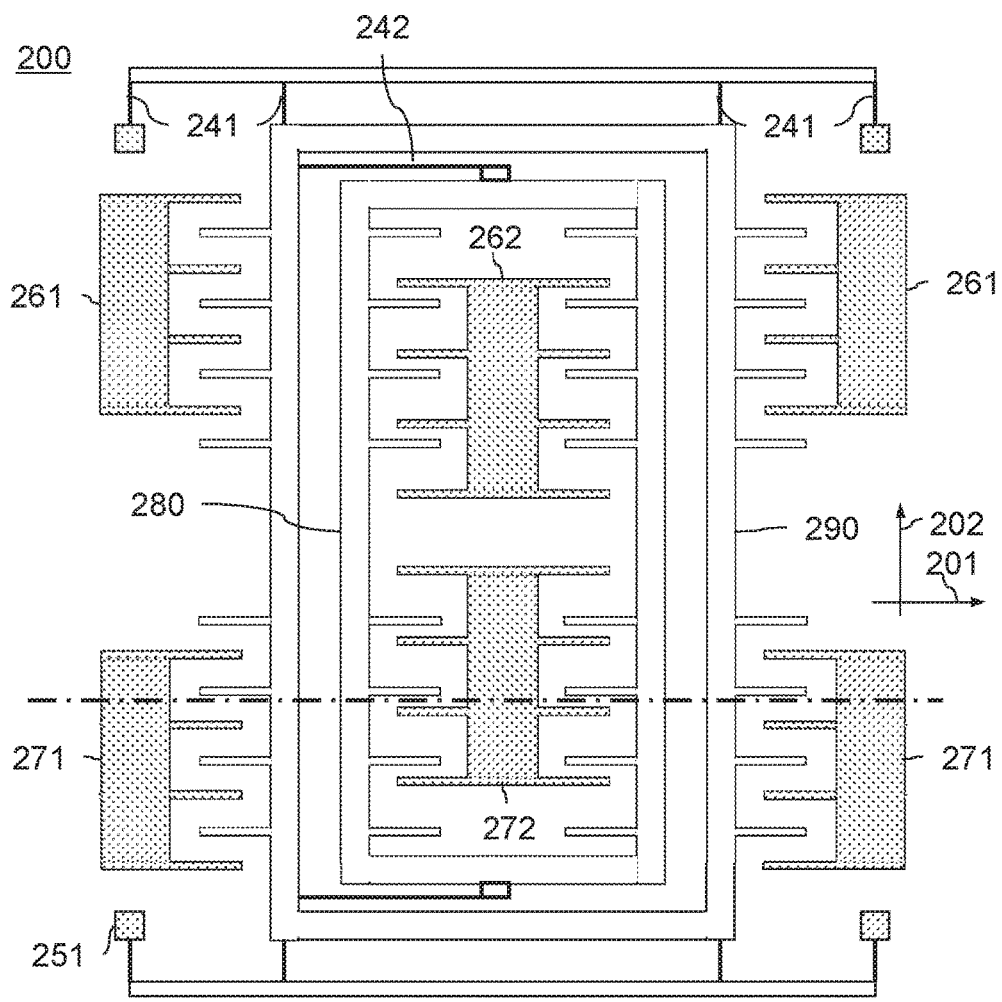

(51) Int. Cl.
*G01C 19/5635* (2012.01)
*G01C 19/5656* (2012.01)

(58) Field of Classification Search
USPC ............. 73/1.37, 1.38, 504.02–504.04,
73/504.11–504.17
See application file for complete search history.

(56) References Cited

FOREIGN PATENT DOCUMENTS

| DE | 103 62 031 A1 | 4/2005 |
| DE | 10 2010 061756 A1 | 5/2012 |
| DE | 102010061756 A1 | 5/2012 |
| JP | 2004294405 A | 10/2004 |

OTHER PUBLICATIONS

International Search Report for Application No. PCT/EP2015/077952 dated Feb. 17, 2016.
Petkov, Vladimir P., and Bernhard E. Boser. "A fourth-order/spl Sigma//spl Delta/interface for micromachined inertial sensors." IEEE Journal of solid-state circuits 40.8 (2005): 1602-1609.
Decision to Grant for corresponding Japanese patent application No. 2017-547133, dated Jan. 30, 2018.

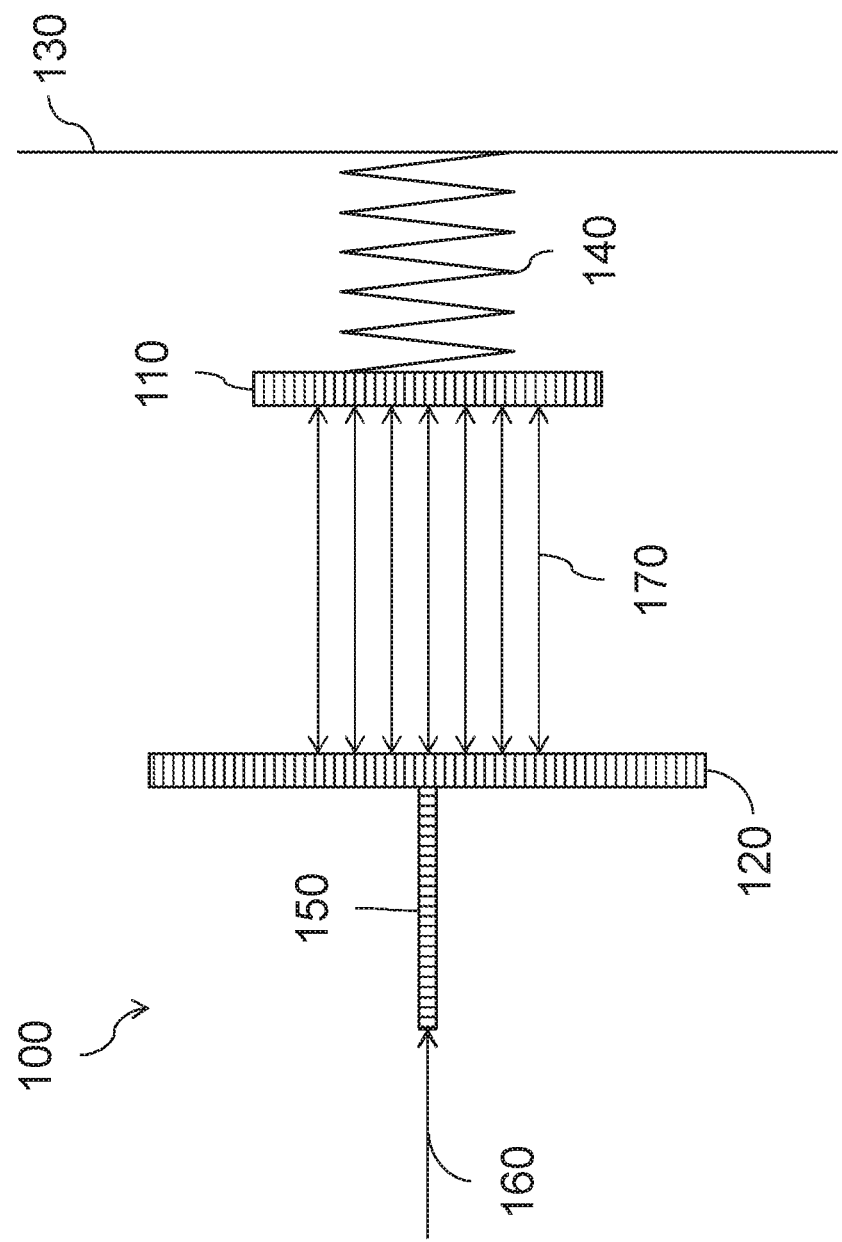

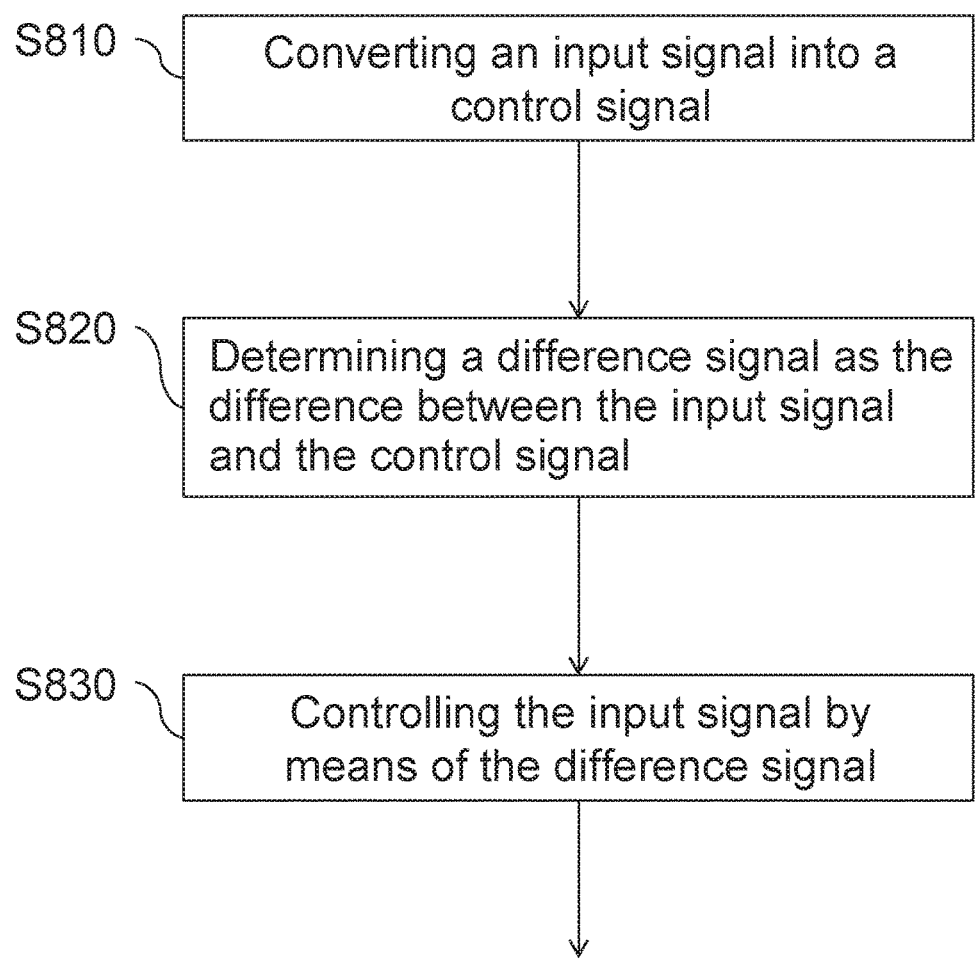

DEVICE AND METHOD FOR PROCESSING OF RESIDUAL VALUES WHEN CONTROLLING A SENSOR

RELATED APPLICATIONS

The present invention is a U.S. National Stage under 35 USC 371 patent application, claiming priority to Ser. No. PCT/EP2015/077952, filed on 27 Nov. 2015; which claims priority of DE 10 2015 003 196.1, filed on 12 Mar. 2015, the entirety of both of which are incorporated herein by reference.

The invention is concerned with a device for processing of residual values and a method for processing residual values.

Present technology is in need of highly precise sensors in many areas. These capture typically measurement data by means of measurements of a deviation of a sensing head from a rest or reset position. In this manner, in mechanical sensors the stress or tension on a spring is measured, which are caused by changes in position or orientation of the sensing head. Based thereon the desired measurement data are determined. In capacitive sensors the position change of the sensing head lead to a change of the capacity between the sensing head and a test mass. This capacity can be measured and the desired measurement values can be determined therefrom.

In order to provide a highly precise sensor it is therefore necessary to precisely determine the position of the sensing head before as well as during the measurement. Ideally, the measurement system returns after measurement to a rest state in which the sensing head is in a precisely defined reset position.

However, according to the design of the measurement system it may take some time until the measurement system returns to the rest state. In particular, if after the measurement the sensing head performs oscillations with low damping, it may take a long time until it is in the reset position again. Precise measurement during this time is not possible, as the position of the sensing head is not exactly known.

Moreover, it is possible that the sensing head of a measurement system is removed by undesired shocks from its reset position. Also in this case the precision of measurements may be impaired.

Therefore, it is necessary to ensure that the sensing head is in its reset position before starting a measurement. Typically, this is achieved by a reset force that acts against the movements of the sensing head and achieves in that manner a quick transient oscillation to the reset position.

For some sensor types such as for example for rotation rate sensors that are actively reset, a reset force has to act on the sensing head, which is temporarily variable. In rotation rate sensors this is necessary to compensate a deflection by the Coriolis force. The reset force is then typically an oscillation having a specific operating and/or angular eigenfrequency $\omega_0$ and a specific amplitude. Therefore, the rotation rate sensor has to be operated by a frequency that is significantly different from zero to ensure a transient oscillation to the angular frequency $\omega_0$ at specific amplitude.

Ideally, in capacitive sensors the sensing heads or sample masses are exactly controlled or reset by the desired (e.g. to be calculated) force. In this case, the force is generated via voltages at electrodes, which lead to electrostatic forces. For example, two electrodes are used, i.e. two voltages are provided, which generate due to the generated electric field between the electrodes a force K between the electrodes. The size of the force K is $K=C\ U^2/d$, wherein C is the capacity between the electrodes, U is the applied voltage, and d is the distance between the electrodes. Therefrom it follows that for generating a specific force K the applied voltage has to be proportional to the root of K.

Here, the reset force may for example be generated by two electrode pairs that face each other, i.e. the reset force is the result of their common action. For example, a voltage $$U_1 = U_0 \sqrt{f + \frac{F}{2}}$$

can be applied to the first electrode pair and a voltage $$U_2 = U_0 \sqrt{f - \frac{F}{2}}$$

to the second electrode pair. For the same capacity C and the same distance between the electrodes this leads to a total force $K=C/d\ (U_1^2-U_2^2)=C/d\ U_0^2 F$. Using the value of F it is therefore possible to adjust the reset force. f is a free parameter that can be used for other purposes.

The force necessary for resetting is often calculated digitally and has to be converted into an analog signal for applying it to the sensing head. In real appliances, at transitions between the e.g. digitally calculated force to the analog physical voltages, errors are generated by converting in digital/analog converters, which converting is also called "quantization". In particular, non-ideal "quantized" signals are generated, e.g. by using the aforementioned root functions and their calculation and/or by using digital converters having a finite word length (e.g. 16 bit).

These errors that are generated during quantization may affect the sensor system properties negatively in various manners. Therefore, a so-called "processing of residual values" is necessary during which the quantization error is determined and it is tried to minimize the error in the relevant frequency band by feeding back the error into the sensor system.

Figure 9A:
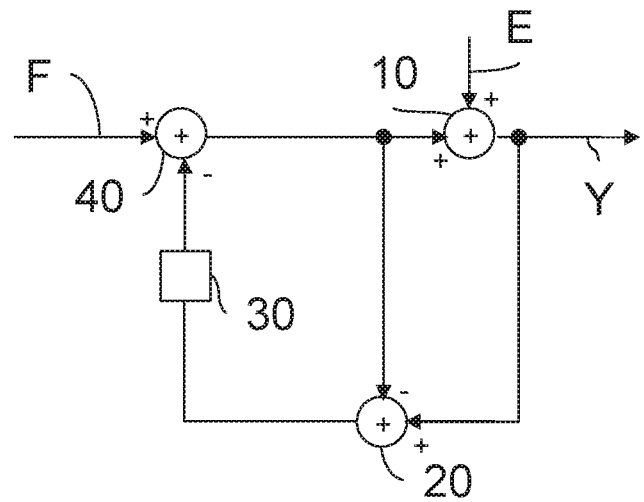

According to the prior art this is achieved by means of a control loop that is illustrated schematically in FIG. 9A. In the following description the time dependency of the signals F, E, and Y illustrated in FIG. 9A is indicated by subscripted time indications. Signals that are considered at time "t" are therefore marked with a subscripted "t".

To the signal $F_t$ input at time t the quantization error $E_t$ is added in first iteration by quantizing at the digital/analog converter 10. The quantized signal $Y_t$ is used for resetting and/or controlling the sensor system. The unknown error $E_t$ is determined by comparing the input signal $F_t$ with the quantized signal $Y_t$ in a comparison unit 20 and is stored in a register 30.

In the next time step the error $E_t$ stored in the register 30 is subtracted with a subtractor 40 from the input signal. Hence, the difference between the input signal $F_{t+T}$ at the time (t+T) and the error $E_t$ at time t is calculated. T is here the sampling rate of the input signal F. The output signal $Y_{t+T}$ is therefore $$Y_{t+T}=F_{t+T}+E_{t+T}-E_t.$$

Forming the z transform of this expression (using $z=e^{i\omega T}$) one obtains $$Y(z)=F(z)+E(z)(1-z^{-1}).$$

The transfer function $G_E(z)$ of the difference signal (i.e. of the error signal) E(z) to the output Y(z) is therefore $$G_E(z)=E(z)(1-z^{-1})/E(z)=1-z^{-1}.$$

Figure 10:
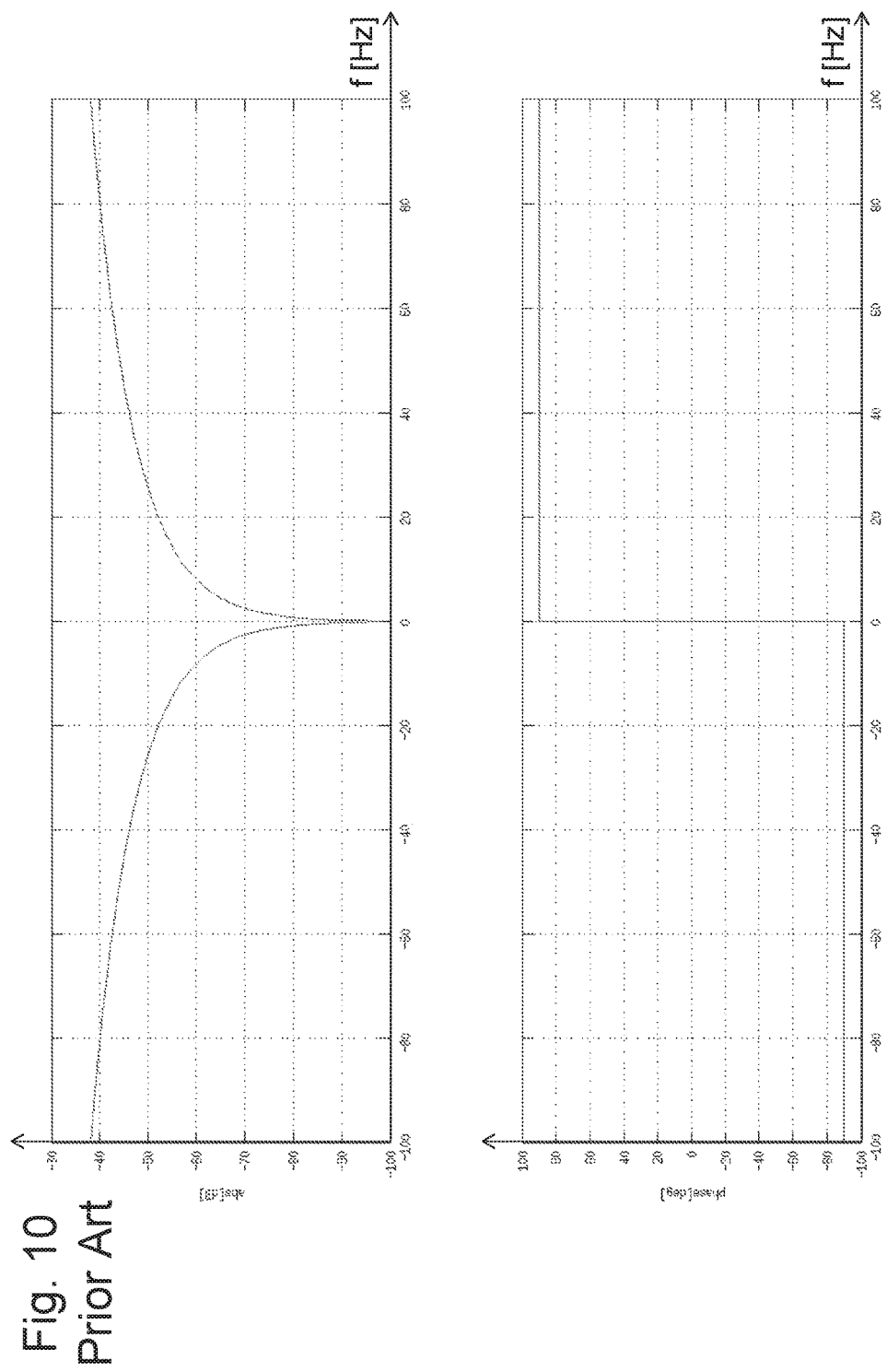

The absolute value of this transfer function is indicated in the upper part of FIG. 10, its phase (or argument) in the lower part. The transfer function has a zero point at $\omega=0$, since here z=1.

Figure 9B:
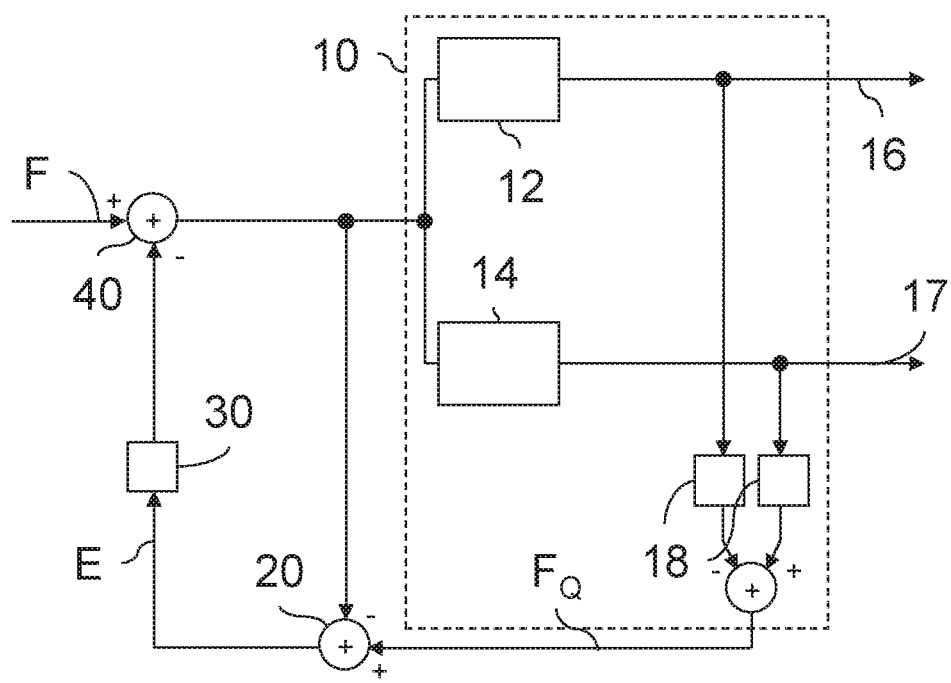

FIG. 9B illustrates schematically a concrete embodiment of the control loop illustrated schematically in FIG. 9A according to the prior art. In particular, the digital/analog converter 10 comprises two root calculators 12 and 14, which calculate the roots $$\sqrt{f+\frac{F}{2}} \text{ and } \sqrt{f-\frac{F}{2}}$$

and convert them into analog control signals 16, 17. In squaring units 18 these roots are squared again and thereafter the difference is formed in order to generate the quantized signal $F_Q$ that constitutes a scaled copy of the force generated at the sensor.

As described with respect to FIG. 9A, therefrom the error E is determined in the comparison unit 20, is stored in the register 30, and is subtracted in the next sampling step by the subtractor 40 from the input signal F.

Due to the zero point at $\omega=0$ this setup is particularly suited for sensors whose elements are operated at a nearly constant or only slowly varying signal (i.e. $\omega \approx 0$). However, this is only the case for some sensors.

In particular, as described above, for rotation rate sensors the reset force has an oscillation behavior having a specific operation or angular eigenfrequency $\omega_0$. Then, the rotation rate sensor has to be operated also with a frequency significantly different from zero. As illustrated in FIG. 10 the transfer function $G_E$ of the quantization error E is unequal zero for such frequencies. This means that in these regions one has to assume large errors due to quantization effects. This leads to an imprecise control of the sensor and hence to a limitation of the precision of the sensor.

The invention is concerned with the problem to provide a device for processing residual values that does not have quantization errors at an operation and/or resonance angular frequency $\omega_0$ of a sensor to be controlled. Further, it is desirable to provide an according method.

This is achieved by the subject-matter of the independent claims. Advantageous embodiments are indicated in the respective dependent claims.

A device for controlling a sensor is provided that has a converter unit for converting an input signal into a control signal for controlling the sensor, a comparison unit for determining a difference signal that indicates the difference between the input signal and the control signal, and a control unit for controlling the input signal by means of the difference signal. Here, a transfer function of the difference signal has a zero point at an operating frequency of the sensor that is unequal zero.

In addition, the above problem is solved by a method for controlling a sensor having the steps: converting an input signal into a control signal for controlling the sensor; determining a difference signal that indicates the difference between the input signal and the control signal; and controlling the input signal by means of the difference signal.

Here, a transfer function of the difference signal comprises a zero point at an operating frequency of the sensor that is unequal zero.

Due to these embodiments the error between the input signal and the control signal, i.e. the difference signal becomes zero at the operating frequency of the sensor to be controlled, since the transfer function of the difference signal has a zero point at this frequency. The operating frequency may be the same as the resonance frequency of the sensor. Biasing of sensor control due to quantization errors close to its operation or resonance frequency is reduced due to this and a precise, reliable operation of the sensor is ensured.

Further, in particular for small signals, substantially improved sensor linearity is obtained.

In addition, sensors can be controlled without error, whose sensors' operating frequency is unequal from zero. This is for example the case for rotation rate sensors, in which an oscillation mass within the rotation rate sensor performs oscillation at an operating frequency unequal from zero for a measurement to be carried out.

In a further example the sensor is a capacitive sensor. Due to this, the sensor can be controlled and readout precisely alone by means of electrical signals.

In a further example the sensor is a micromechanical rotation rate sensor, such as a micro-electro-mechanical sensor (MEMS). As micromechanical rotation rate sensors need a basis oscillation that is different from zero to be able to measure a rotation rate, also micromechanical rotation rate sensors can be controlled without quantization error.

In a further example, the sensor may be operated in a bandpass band around its operating frequency. Regions of the frequency spectrum in which the frequency deviates significantly from the operating frequency and in which the quantization error is therefore substantially different from zero are then damped by a bandpass filter. Hence, the quantization error is reduced and the entire frequency range and the reliability and precision of the sensor are increased.

In a further example the converter unit comprises a digital/analog converter. Further, the input signal is a digital signal and the control signal is an analog signal. Digitally calculated control parameter are converted into analog control signals and transferred to the sensor, while quantization errors that are generated by the digital/analog conversion are reduced. This enhances the reliability and precision of the sensors.

The converter unit may be configured to perform, based on the input signals, a calculation of roots in order to generate in the sensor electrostatic reset forces that are as precise as possible as was explained above. The quantization error of a root calculation necessary for controlling the sensor is reduced in that way.

The control unit may generate the transfer function by processing the difference signal and feeding back the processed difference signal to the input signal. The zero point in the transfer function of the difference signal is then generated by a simple setup. The transfer function is modified according to this example alone by a processing of the difference signal, i.e. of the quantization error. This may be achieved in different manners, e.g. by arranging different registers and multiplication units into the control unit.

In particular, by using different registers and/or multiplication units additional terms in the transfer function of the difference signals can be generated that lead to generation and/or shifting of zero points of the transfer function. In this manner the transfer behavior of the difference signal and hence the quantization error can be adjusted flexible and easily.

In particular, it is also possible to generate transfer functions that have more than one zero point and allow therefore a quantization error free control of a sensor at different frequencies.

The transfer function of the difference signal $G_E(z)$ may satisfy the following equation:

$$G_E(z)=1-2z^{-1}\cos(\omega_0 T)+z^{-2},$$

with $z=e^{i\omega T}$, $\omega_0$ the operating angular frequency, T the sampling rate of the input signal, and $\omega$ the angular frequency.

The transfer function is generated merely based on the difference signal, two registers and a multiplication unit, and the control unit has a simple setup.

The transfer function of the difference signal may also be a function of at least the third power in $z^{-1}$. This allows controlling a plurality of frequencies without quantization error.

In what follows embodiments of the invention, their functioning, as well as their advantages are described based on the figures. Elements of embodiments can be combined with each other unless they exclude each other. It shows:

FIG. 1 a schematic illustration of an embodiment of a capacitive sensor.

FIG. 2A a schematic top view of a micro-mechanic part of a rotation rate sensor according to an embodiment.

Figure 2B:
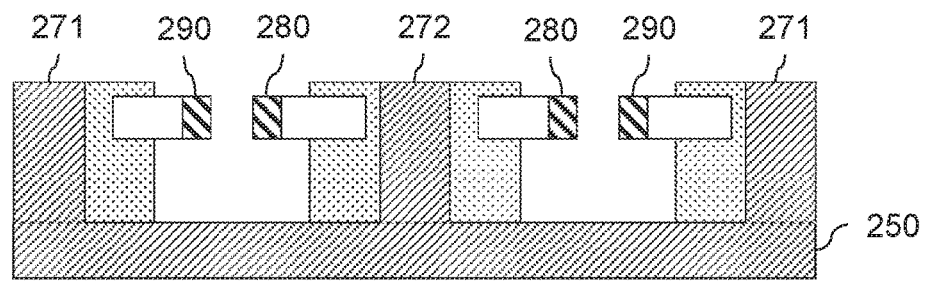

FIG. 2B a schematic sectional view the micro-mechanic part of the rotation rate sensor of FIG. 2A.

Figure 3:
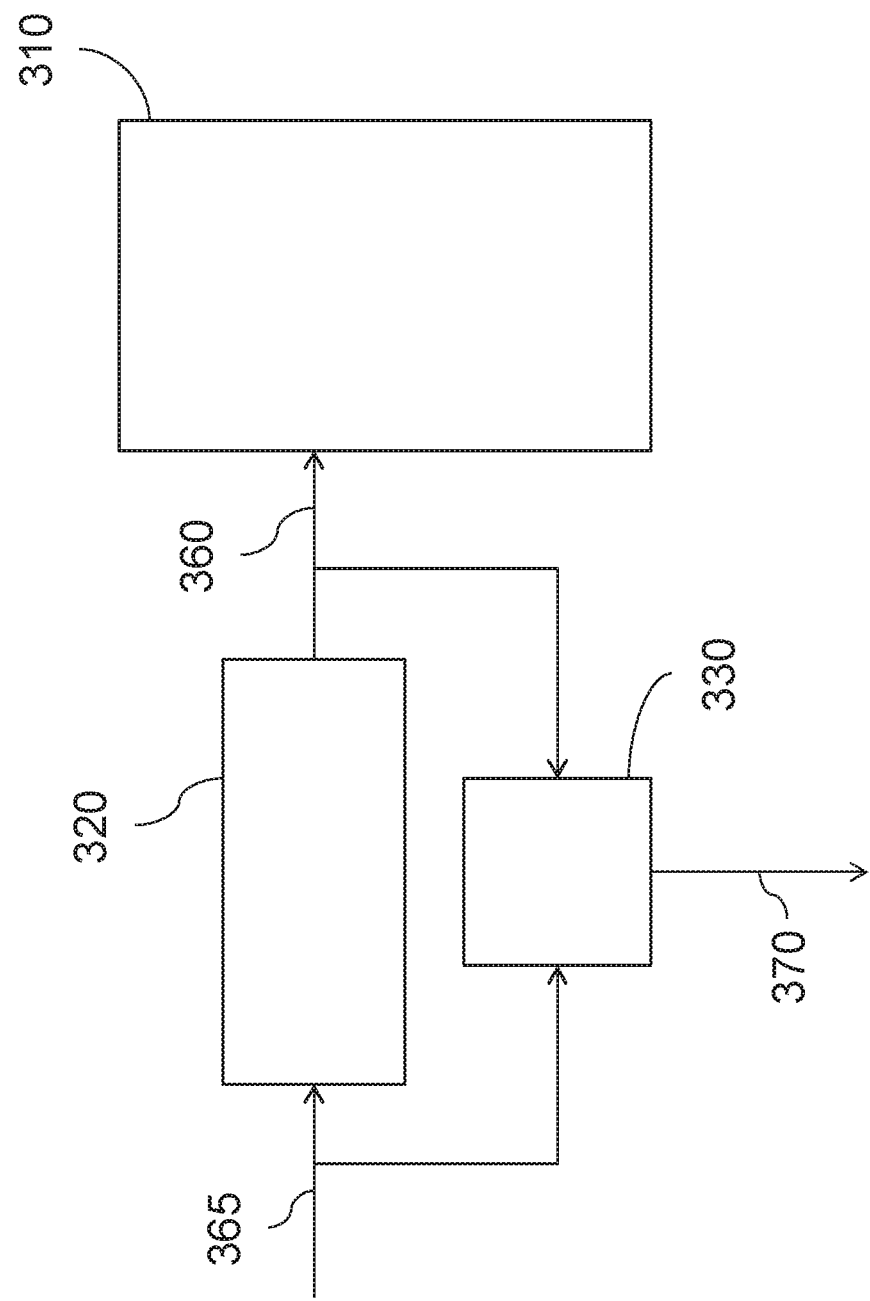

FIG. 3 a schematic block diagram of a converter unit, a comparison unit, and a sensor according to an embodiment.

Figure 4:
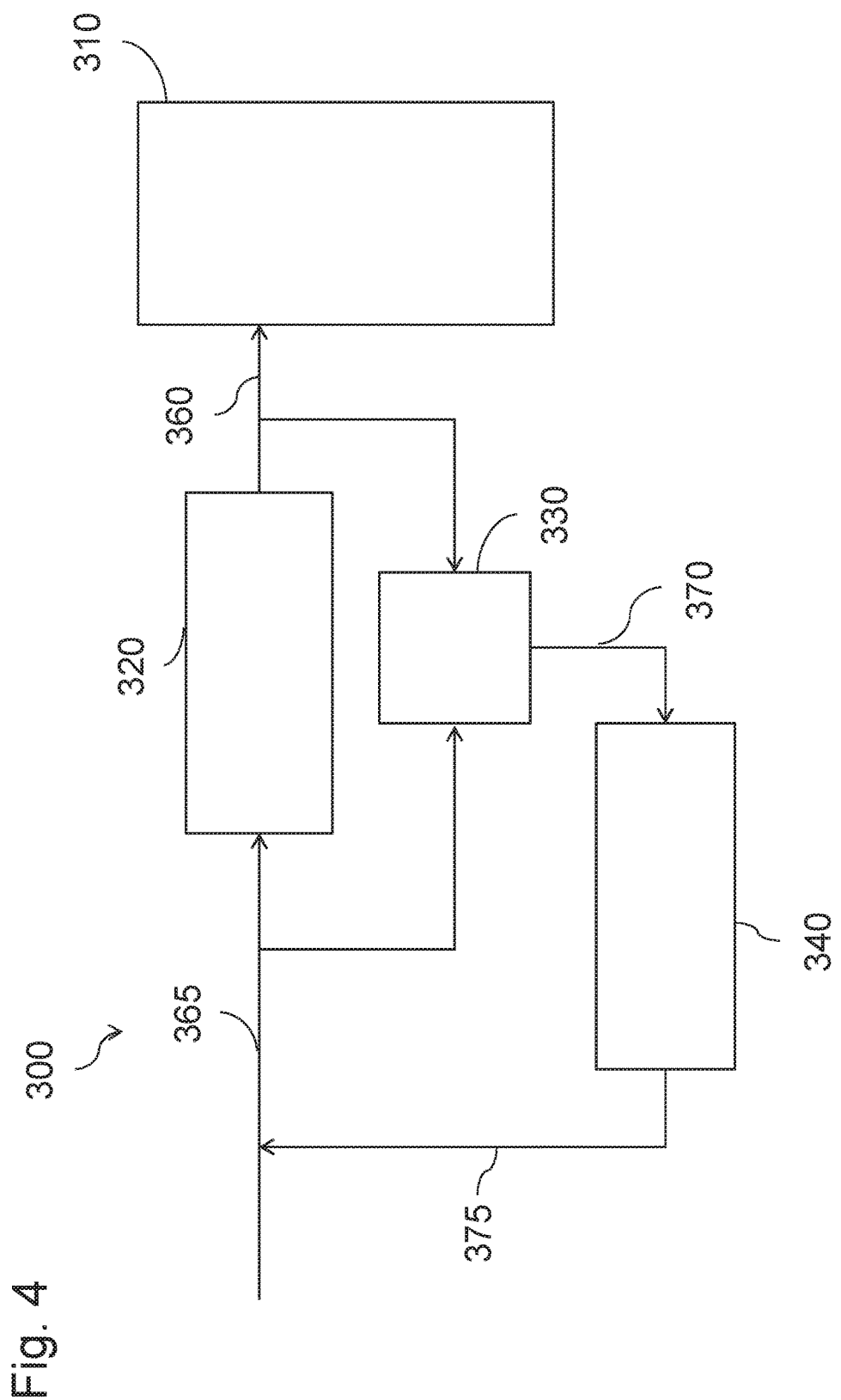

FIG. 4 a schematic block diagram of a device for controlling a sensor according to an embodiment.

Figure 5A:
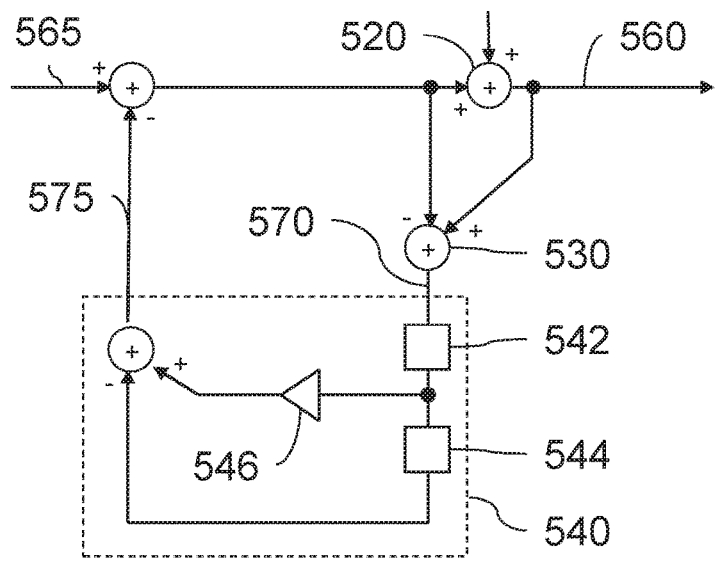

FIG. 5A a schematic block diagram of a control loop according to an embodiment.

Figure 5B:
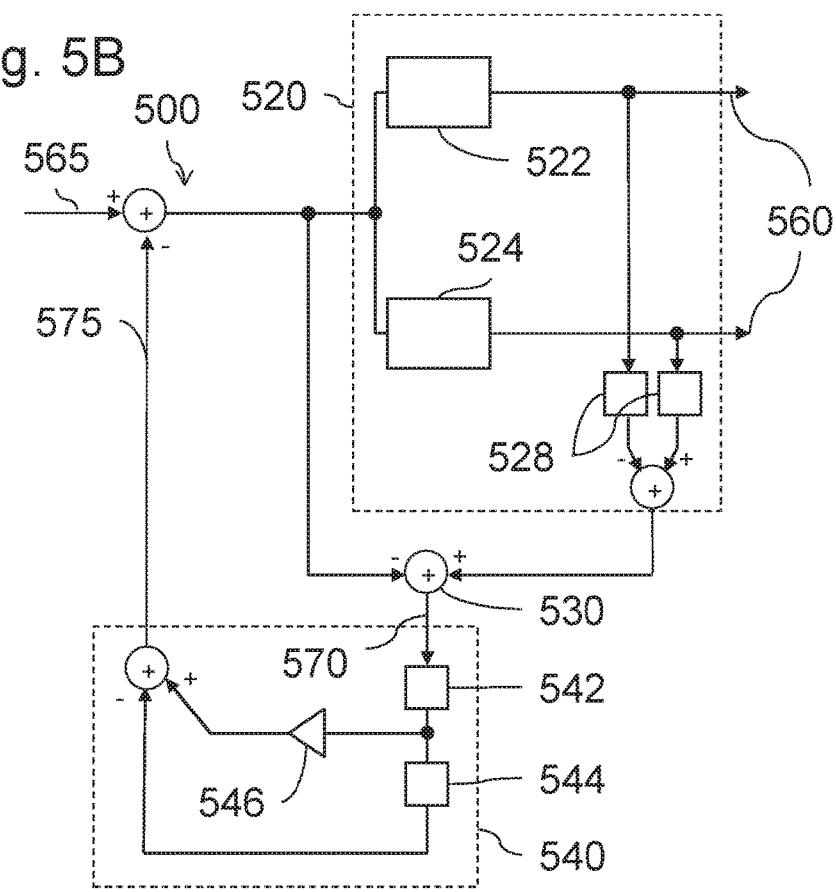

FIG. 5B a schematic block diagram of a device for controlling a sensor having the control loop of FIG. 5A.

Figure 6:
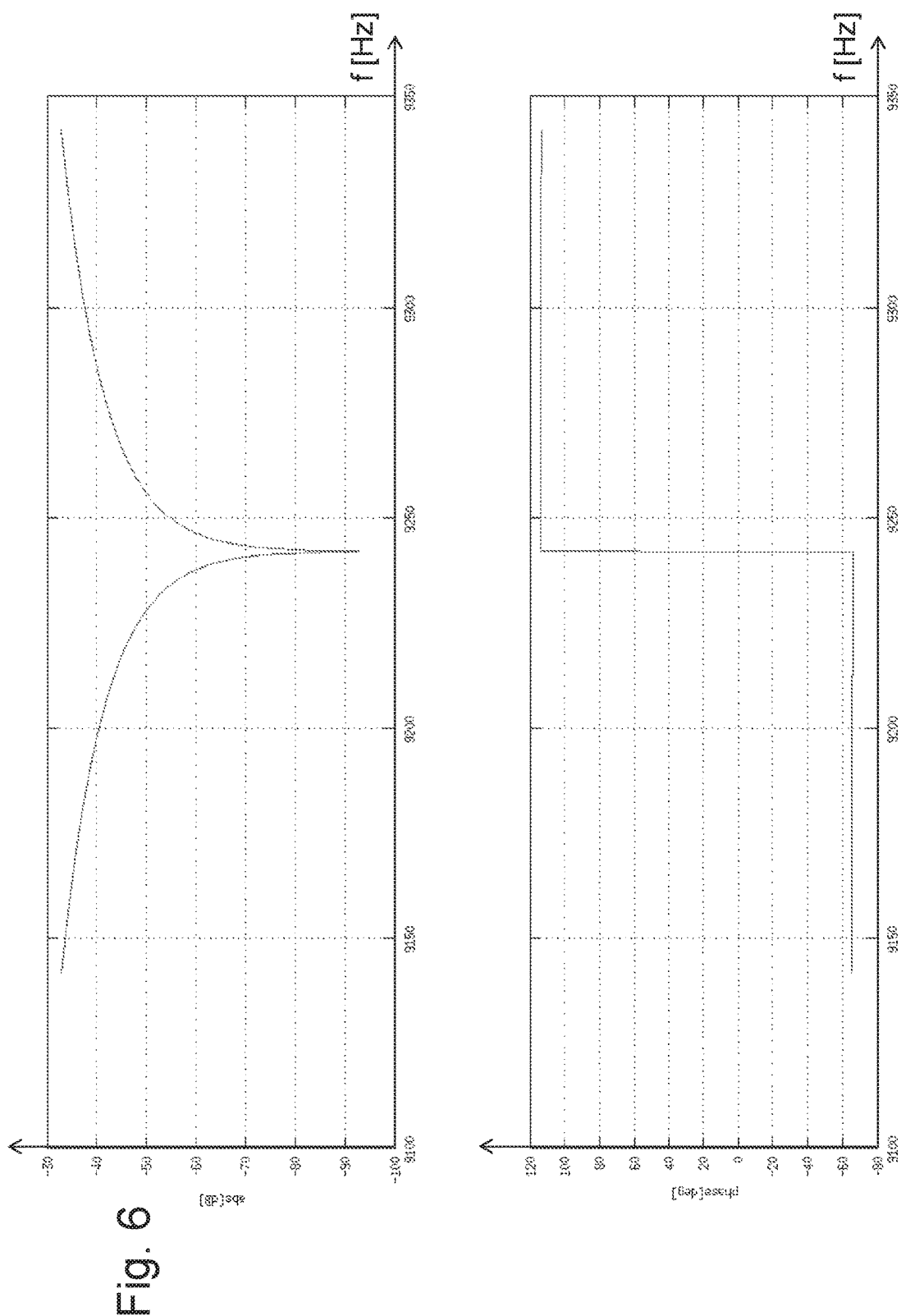

FIG. 6 the absolute value and the phase of a transfer function of a difference signal according to the embodiments illustrated in FIGS. 5A and 5B as functions of the frequency.

FIG. 7A to 7F schematic block diagrams of control loops according to further embodiments.

FIG. 8 a process flow of a method for controlling a sensor according to an embodiment.

FIGS. 9A and 9B schematic views of a control loop for processing of residual values according to the prior art.

FIG. 10 the absolute value and the phase of a transfer function of a difference signal according to the prior art illustrated in FIGS. 9A and 9B as function of the frequency.

In the figures elements or groups of elements that correspond to each other are indicated by the same reference signs.

FIG. 1 shows a schematic view of an embodiment of a capacitive sensor 100. The capacitive sensor 100 comprises a sample mass 110, an actuating and/or sensor unit 120, a support structure 130, and a spring element 140.

The sample mass 110 is coupled by means of the spring element 140 to the support structure 130. The sample mass 110 may for example be a sensing head. The spring element 140 may, as illustrated in FIG. 1, be a spring, however, also different designs of the spring element 140 may be used that allow a movement and/or oscillation of the sample 110 with respect to the support structure 130. For example, the spring element 140 may also be formed from thin beams or wires.

The support structure 130 is fixedly connected to a non-illustrated frame of the capacitive sensor 100. The support structure 130 may for example be a wall of the capacitive sensor 100. However, the support structure may also be formed by protrusions or similar structures that are fixedly connected to the frame of the capacitive sensor.

In similar manner as the support structure 130 also the actuating and/or sensor unit 120 may be fixedly connected to a frame or a wall of the capacitive sensor 100. The actuating and/or sensor unit 120 may also be connected to different, not illustrated, moveable elements of the capacitive sensor 100. In particular, the actuating and/or sensor unit 120 and the support structure 130 may have a fixed distance with respect to each other.

The actuating and/or sensor unit 120 receives by means of electric wires 150 a control signal 160 which causes appliance of a predetermined voltage U between the actuating and/or sensor unit 120 and the sample mass 110.

Applying the voltage U leads to the formation of an electric field 170 that attracts the sample mass 110. Due to this attraction the spring element 140 that connects the sample mass 110 to the support structure 130 is extended. The sample mass 110 moves towards the actuating and/or sensor unit 120. In this case the actuating and/or sensor unit 120 acts as an actuating unit. However, by applying a voltage, e.g. by means of a voltage amplifier, also the position of the sample mass 110 with respect to the actuating and/or sensor unit 120 and the supporting structure 130 may be determined. In this case the actuating and/or sensor unit 120 acts as sensor unit.

In particular, the sample mass 110 can be brought by the actuating unit 120 to a specific, precisely defined position that may serve as reset position for a measurement to be carried out. By using several actuating units the sample mass 110 can be moved in different directions. In particular, it is possible to excite the sample mass 110 by applying AC voltages at the actuating units 120 to perform an oscillation having an operating angular frequency $\omega_0$ or an operating frequency of $f_0=\omega_0/2\pi$. The operating angular frequency $\omega_0$ may be equal to the resonance angular frequency of the oscillation system formed by the sample mass 110, the spring element 140, and the supporting structure 130. In this manner an oscillation of the sample mass 110 necessary for a measurement can be adjusted by the control signal 160.

If the position of the sample mass 110 changes due to a measurement, such as a force acting from outside due to e.g. a linear or angular acceleration or due to a Coriolis force caused by a rotational movement, this will lead to a change of the electric field 170 and hence to a change of the voltage in the actuating and/or sensor unit 120. This voltage change can be read out via the electric wire 150 and it is therefore possible to capture a measurement result for the position change of the sample 110. Alternatively, also the voltage can be kept at a known level. Then, a change of charges occurs that can be read out by means of a charge amplifier, if the capacity of the electrode pairs is changed due to a movement. In both cases the actuating and/or sensor unit 120 acts as sensor unit.

Hence, it is possible to read out, via the electric wire 150, measurement data from the capacitive sensor 100 as well as to control the capacitive sensor 100 via the control signal 160.

FIGS. 2A and 2B show schematic views of a micro-mechanic part of a rotation rate sensor such as a microelectromechanical sensor (MEMS) according to an embodiment. FIG. 2B is a section of the micro-mechanic part of the rotation rate sensor along the dash-dotted line of FIG. 2A.

FIGS. 2A and 2B relate to a micromechanical rotation rate sensor 200 according to an embodiment. The rotation rate sensor 200 comprises an outer sample mass 290 that is supported on first spring elements 241, e.g. an excitation frame. The first spring elements 241 couple the sample mass 290 to a supporting structure 251 hat is fixedly connected to a support substrate 250 illustrated in FIG. 2B. The spring elements 241 damp a deflection of the outer sample mass 290 with respect to the supporting substrate 250 along the excitation direction 201 only weakly. Via second spring elements 242 an inner sample mass 280 is coupled to the outer sample mass 290 and is movable with respect to the outer sample mass 290, substantially along a detection direction 202 that is orthogonal to the excitation direction 201. Excitation direction 201 and detection direction 202 are parallel to a surface of the supporting substrate 250. The first and second spring elements 241, 242 are for example beam-like structures having small cross sections that are formed between the structures that are coupled to each other respectively.

According to an embodiment the rotation rate sensor 200 comprises first actuating and/or sensor units 261, 271, e.g. electrostatic actuators and sensors that excite the system formed by the outer sample 290 and the inner sample 280 to an oscillation along the excitation direction 201 and/or capture an according deflection of the outer sample mass 290.

As described above with respect to FIG. 1 it is possible to adjust by means of a control signal that is fed to the first actuating and/or sensor units 261, 271 a position or oscillation of the outer sample mass 290 or to perform a measurement by reading out a signal.

The rotation rate sensor 200 further comprises second actuating and/or sensor units 262, 272, e.g. electrostatic actuators and sensors that are acting on the inner sample mass 280 and/or are capable to capture its deflection. It is therefore possible to adjust the position or oscillation of the inner sample mass 280 by means of a control signal that is fed to the second actuating and/or sensor units 262, 272 and to readout measurement data.

During operation of the rotation rate sensor 200 for example the first actuating and sensor units 261, 271 excite the outer sample mass 290 to an oscillation having an operating angular frequency $\omega_0$ along the excitation direction 201, wherein the inner sample mass 280 moves substantially with the same amplitude and phase together with the outer sample mass 290. If the arrangement is rotated around an axis orthogonal to the plane of the substrate, a Coriolis force will be acting on the outer sample mass 290 and the inner sample mass 280 that deflects due to the springs 241 that are stiff in this direction only the inner sample mass 280 relatively to the outer sample mass 290 along the detection direction 202. The second actuating and sensor units 262, 272 captures the deflection of the inner sample mass 280 and hence the rotational movement around the axis orthogonal to the plane of the substrate.

In order to be able to carry out the aforementioned measurement, it is necessary to adjust the oscillation of the outer sample mass 290 as exactly as possible. in order to be then able to determine a change of the oscillation of the inner sample mass 280 that moves before starting the measurement approximately with the same amplitude and phase as the outer sample mass 290. Therefore, it is necessary to control the outer sample mass 290 and the inner sample mass 280 by means of control signals as exactly as possible. In this process it is in particular necessary to minimize errors that are generated by converting of signals (digital/analog conversion).

FIG. 3 illustrates the generation of such errors in a schematic block diagram. According to the embodiment illustrated in FIG. 3 a sensor 310 is supplied with a control signal 360 via a control unit 320. This control signal 360 is used for controlling the sensor 310 and may as described above be used for adjusting a specific operating angular frequency $\omega_0$ of the sensor or for positioning a sensing head within the sensor 310. The operating frequency may have every value that is useful for operating the sensor. In particular, the operating frequency may be different from zero.

The control signal 360 is generated at the converter unit 320 from an input signal 365. The input signal 365 may for example be a digital signal generated in a computing unit, such as e.g. a computer, which signal is converted at the converter unit 320 into an analog control signal 360. Then, the converter unit 320 is a digital/analog converter. However, it is also possible that an analog input signal 365 is converted by the converter unit 320 into a digital control signal 360. Then, the converter unit is an analog/digital converter.

By converting a discontinuous signal, e.g. a digital signal, into a continuous signal, as done by the converter unit 320, errors may arise. This may for example be the case due to a finite word length (e.g. 16 bit) of the converter unit 320. However, it is also possible that within the converter unit further processing steps are carried out such as for example a calculation of roots. Also in this case a difference between the input signal 365 and the control signal 360 may be present.

Due to such errors a difference between the input signal 365 and the control signal 360 arises that may cause an erroneous control of the sensor 310. The difference between the control signal 360 and the input signal 365 may be determined by a comparison unit 330 and may be read out as difference signal 370. The difference signal is then used to control the input signal 365 such that the difference signal 370 vanishes at an operating frequency of the sensor 310. Differently stated, the transfer function of the difference signal 370 must have a zero point at an operating frequency of the sensor 310.

According to an embodiment illustrated in FIG. 4 in a device 300 for controlling the sensor 310 the difference signal 370 is supplied to a control unit 340. In the control unit 340 the difference signal 370 is processed. To this end, the control unit 340 may comprise different circuitry. In particular, the control unit 340 may comprise different registers for storing of difference signals 370 at different times and multiplication units for multiplying of predetermined functions with the difference signals 370 that have been stored at predetermined times. By such circuits the control unit 340 may process the difference signal 370 such that a transfer function of the difference signal has a zero point at least at one operating frequency of the sensor 310.

A processed difference signal or control signal 375 is fed back from the control unit 340 to the input signal. By this feedback the input signal 365 is modified such that the difference signal 370 at an operating frequency of the sensor 310 becomes zero. Then, the control signal 360 corresponds at the operating frequency of the sensor 310 to the input signal 365. In particular, the operating frequency may also be equal to a resonance frequency of the sensor. Then, a quantization error during operation of the sensor 310 becomes minimal.

However, it is also possible to generate transfer functions of the difference signal 370 that have more than one zero point and allow therefore an error-free control of the sensor at different operation and/or resonance frequencies.

According to a further embodiment the control unit 340 may be designed such that if the operating frequency of the sensor 310 deviates from the resonance frequency of the sensor 310, the difference signal 370 will be zero at the resonance frequency of the sensor 310. This means that the transfer function of the difference signal 370 has a zero point at the resonance frequency of the sensor 310.

This setup ensures that the control signal 360 that is used for controlling the sensor 310 corresponds at frequencies relevant for operating the sensor 310 to the input signal 365, while no quantization errors occur. Due to this, a precise and reliable operation of the sensor 310 is possible.

FIG. 5A illustrates a schematic block diagram of an embodiment that comprises the control loop illustrated in FIG. 4.

In a first sampling step an input signal 565 having a value $F_t$ is supplied to a converter unit 520. The converter unit 520 converts the input signal 565 having the value $F_t$ to a control signal 560 having the value $Y_t=F_t+E_t$. The control signal 560 comprises therefore the input signal 565 having the value $F_t$ and an, at first, unknown difference signal 560 having the value $E_t$. The size of the difference signal 570 is determined by a comparison unit 530 and transferred to a control unit 540.

In the control unit 540 the difference signal 570 is stored for the time T in a first register 542, wherein T is the sampling rate of the input signal 565. The sampling rate T may for example be 20 µs. Then (in time step t+T), the difference signal 560 is transferred from the first register 542 to a second register 544 and stored therein again for the time T.

Simultaneously with the transfer from the first register 542 to the second register 544 the difference signal 570 having the value $E_t$ stored in the first register 542 is multiplied in a multiplication unit 546 with the function 2 cos($\omega_0$T), wherein $\omega_0$ is the oscillation frequency of the sensor to be controlled, and then subtracted from the input signal 565.

In the next time step (t+2T) the difference signal 570 having the value $E_t$ stored in the second register 544 is added to the input signal 565. Simultaneously, a signal having the value 2 cos($\omega_0$T)$E_{t+T}$ is subtracted from the input signal 565, which signal is generated by multiplying the difference signal 570 having the value $E_{t+T}$ stored in the first register 542 with the function 2 cos($\omega_0$T) in the multiplication unit 546. At time step t+2T the signal $$F_{t+2T}-2\cos(\omega_0 T)E_{t+T}+E_t$$

arrives at the converter unit 520. Here, the quantization error of the time step t+2T is added ($E_{t+2T}$) such that at time t+2T as control signal 560 a signal having the value $$Y_{t+2T}=F_{t+2T}+E_{t+2T}-2\cos(\omega_0 T)E_{t+T}+E_t$$

is output. Forming the z transform of this expression one obtains (with $z=e^{i\omega T}$, T the sampling rate and $\omega=2\pi f$ the angular frequency)

$$Y(z)=F(z)+E(z)(1-2\cos(\omega_0 T)z^{-1}+z^{-2}).$$

The transfer function $G_E(z)$ of the difference signal (i.e. the error signal) 570 at the output 560 is therefore $$G_E(z)=1-2\cos(\omega_0 T)z^{-1}+z^{-2}=1-G(z) \text{ with } G(z)=2\cos(\omega_0 T)z^{-1}-z^{-2}.$$

The transfer function $G_E(z)$ has a zero point at $\omega_0$. The representation as difference 1−G(z) prepares the discussion of further embodiments.

By suitable choosing $\omega_0$ the zero point of the transfer function may be shifted across the whole frequency range, in particular the angular frequency $\omega_0$ can be the operating frequency or the resonance frequency, if they are different from each other.

The absolute value of the transfer function $G_E(z)$ is illustrated in the upper part of FIG. 6. The phase of the transfer function $G_E(z)$ is illustrated in the lower port of FIG. 6. As can be seen the transfer function $G_E(z)$ is strongly suppressed near the frequency $f_0$ ($\omega_0=2\pi f_0$) such that there only a small quantization error occurs.

It is therefore possible to control a sensor that is operated at the angular frequency $\omega_0$ such that at the angular frequency $\omega_0$ there is approximately no difference between an input signal determined by a computer and the control signal that is actually applied at the sensor.

This effect can be further enhanced by using a bandpass, since a bandpass allows to damp frequency regions in which the quantization error is high. If one selects for example in FIG. 6 additionally a bandpass that only allows frequencies between 9235 Hz and 9250 Hz, then the quantization error is strongly suppressed in the whole relevant range and a precise and reliable operation of the sensor is possible.

FIG. 5B illustrates a schematic block diagram of an embodiment of a device 500 for controlling a sensor having the control loop illustrated schematically in FIG. 5A.

In particular, the converter unit 520 comprises a digital/analog converter having two root calculators 522, 524. These form out of the input signal 565 having value F roots $$\sqrt{f+\frac{F}{2}} \text{ and } \sqrt{f-\frac{F}{2}}$$

that are then converted into analog control signals 560. In squaring units 528 these roots are squared again and thereafter their difference is formed in order to form a quantized signal having the value $F_Q$. The difference of the signals F and $F_Q$ is the difference signal 570.

As described with respect to FIG. 5A in the comparison unit 530 the difference signal 570 having the value E is determined thereafter, which is then transferred to the control unit 540. There, it is processed by means of the first and second registers 542, 544 and the multiplication unit 546 as described above and the control signal 575 formed therein is subtracted from the input signal 565.

It is therefore possible to carry out a calculation of roots necessary for controlling a rotation rate sensor without producing quantization errors at the operating frequency $\omega_0$.

FIGS. 7A to 7F illustrate further embodiments of devices for controlling a sensor. Here, the embodiments of FIGS. 7A to 7A differ only with respect to their control units 640 from the embodiment discussed above with regard to FIGS. 5A and 5B.

The control unit 540 of the embodiments illustrated in FIGS. 5A and 5B generates a transfer function G(z) in the second power of $z^{-1}$. By suitably selecting different circuit elements in the control unit 640 it is, however, also possible to generate transfer functions that comprise higher powers in $z^{-1}$ than the second power. Also the transfer functions $G_E(z)=1-G(z)$ resulting therefrom comprises zero points at frequencies that are different from zero and are therefore suitable for controlling a rotation rate sensor without quantization errors.

Figure 7A:
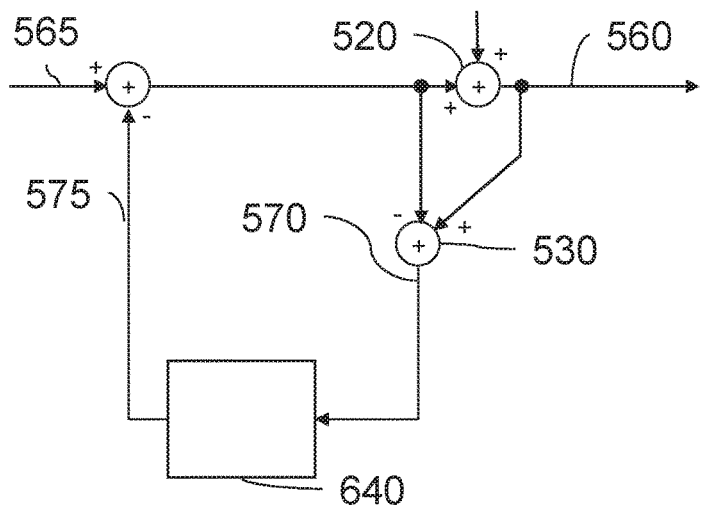
Figure 7B:
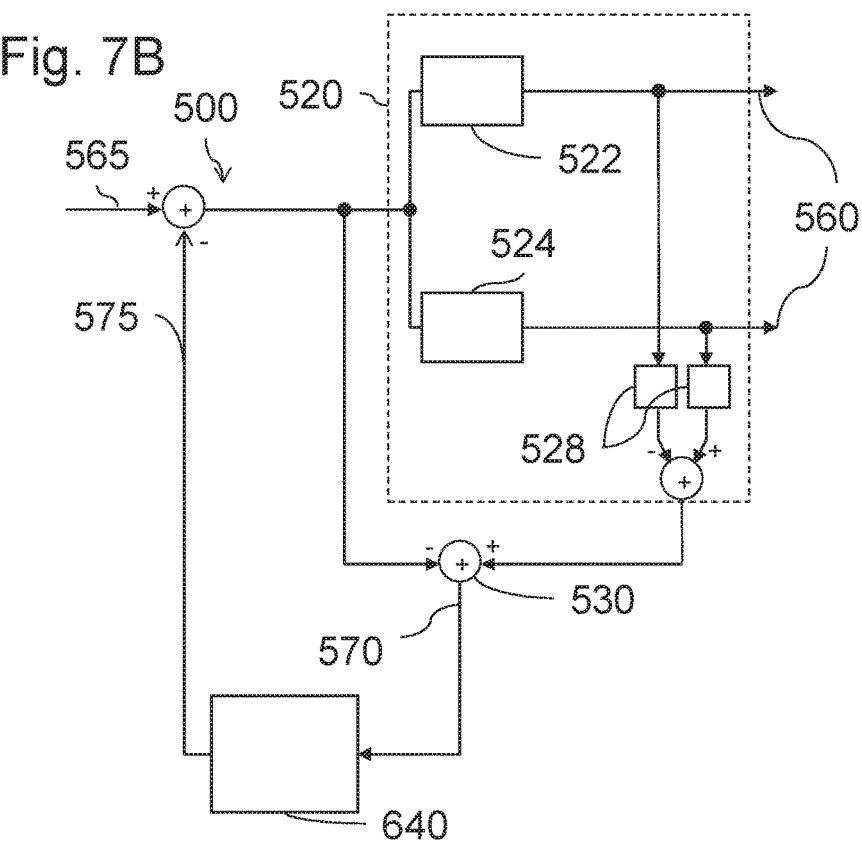
Figure 7E:
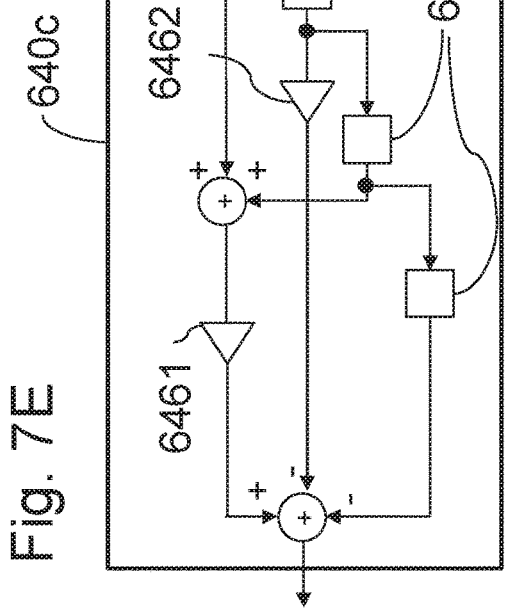
Figure 7F:
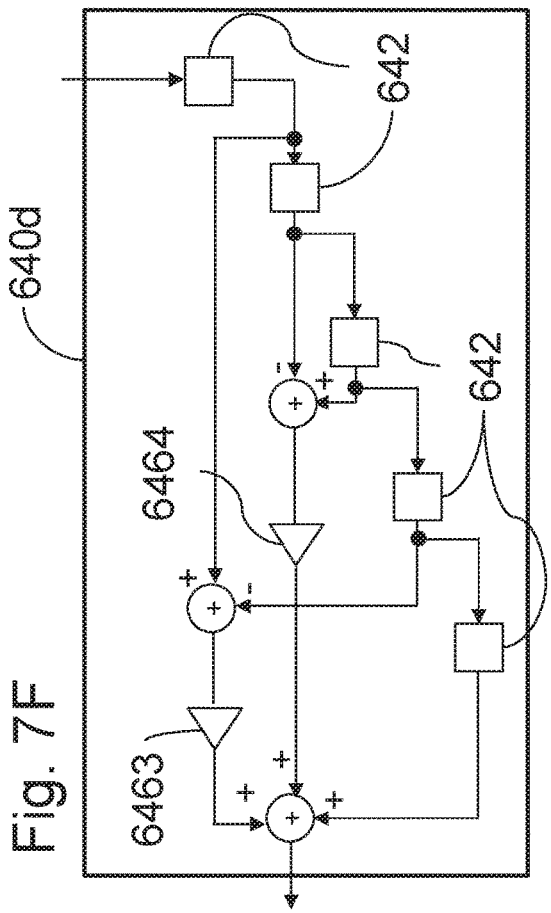
Figure 7C:
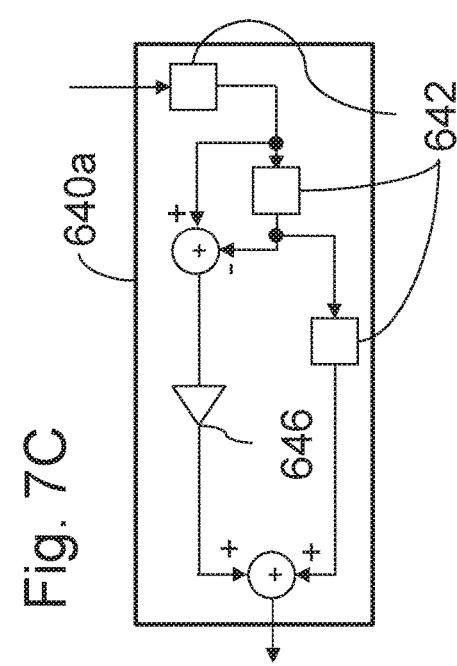
Figure 7D:
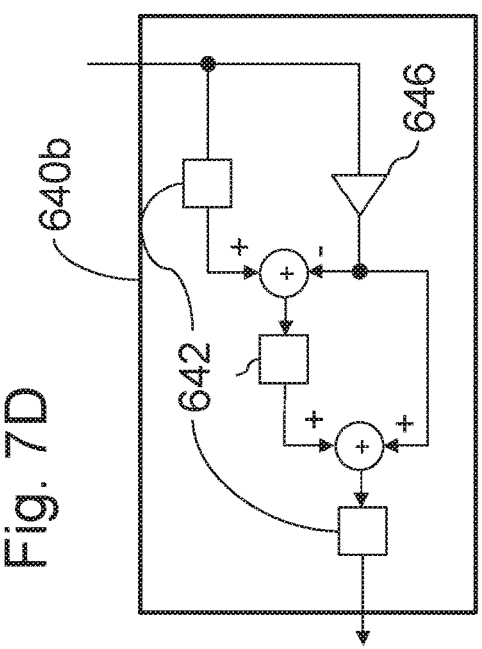

The control units 640a and 640b of FIGS. 7C and 7D comprise each three registers 642 and one multiplicator 646 that multiplies the input signal by (1+2 cos($\omega_0$T)). Due to the circuitry of adders and subtractors, according to FIGS. 7C and 7D the two control units 640a and 640b generate the transfer function $$G(z)=z^{-1}(1+2\cos(\omega_0 T))-z^{-2}(1+2\cos(\omega_0 T))+z^{-3}.$$

As can easily established $G_E(z)=1-G(z)$ has zero points at $\omega=0$ and $\omega=\omega_0$. The control units 640a and 640b are therefore suitable for quantization error-free control of sensors at angular frequencies 0 and $\omega_0$.

The control unit 640 illustrated in FIG. 7E comprises four registers 642 that are connected to a first multiplicator 6461 and a second multiplicator 6462 by means of adders and subtractors. The multiplicator 6461 multiplies signals input thereto by $2(\cos(\omega_1 T)+\cos(\omega_2 T))$, while the multiplicator 6462 multiplies signal input thereto by $2(1+\cos(\omega_1 T)\cos(\omega_2 T))$. Due to this, in the control unit 640 a transfer function in the fourth power of $z^{-1}$ is generated:

$$G(z)=z^{-1}2(\cos(\omega_1 T)+\cos(\omega_2 T))-z^{-2}2(1+2\cos(\omega_1 T)\cos(\omega_2 T))+z^{-3}2(\cos(\omega_1 T)+\cos(\omega_2 T))-z^{-4}.$$

The transfer function $G_E(z)=1-G(z)$ has zero points at angular frequencies $\omega_1$ and $\omega_2$ and is therefore suitable for quantization error-free control of sensors that are operated at these frequencies.

The control unit 640d illustrated in FIG. 7F has five registers 642 that are connected to a third mutiplicator 6463 and a fourth multiplicator 6464 by means of adders and subtractors. The multiplicator 6463 multiplies signals input thereto by $(1+2(\cos(\omega_1 T)+\cos(\omega_2 T)))$, while the multiplicator 6464 multiplies signal input thereto by $2(1+\cos(\omega_1 T)+\cos(\omega_2 T))+2(1+\cos(\omega_1 T)\cos(\omega_2 T))$. Then, the control unit 640d generates a transfer function in the fifth power of $z^{-1}$:

$$G=(z)=z^{-1}(1+2(\cos(\omega_1 T)+\cos(\omega_2 T)))-z^{-2}2(1+\cos(\omega_1 T)+\cos(\omega_2 T)+2\cos(\omega_1 T)\cos(\omega_2 T))+z^{-3}2(1+\cos(\omega_1 T)+\cos(\omega_2 T)+2\cos(\omega_1 T)\cos(\omega_2 T))-z^{-4}(1-(2\cos(\omega_1 T)+\cos(\omega_2 T))+z^{-5}.$$

The transfer function $G_E(z)=1\ G(z)$ comprises zero points at angular frequencies 0, $\omega_1$, and $\omega_2$ and is therefore suitable for quantization error-free control of sensors that are operated at these frequencies.

In similar manner control units may be realized by using several registers and accordingly selected multiplicators that generate transfer functions in higher powers of $z^{-1}$ and therefore with a higher number of zero points. Typically, such transfer functions can be realized by different circuitries as is for example illustrated for functions of third power in $z^{-1}$ based on FIGS. 7C and 7D.

By a suitable selection of a control unit it is therefore possible to generate transfer functions that are suitable for quantization error-free control of sensors at an arbitrary number of frequency values.

FIG. 8 illustrates a process flow of a method for controlling a sensor according to an embodiment.

At S810 an input signal is converted to a control signal.

At S820 a difference signal is determined as difference between the input signal and the control signal.

At S830 the input signal is controlled by means of the difference signal. The input signal is then converted again into a control signal by which process a closed control loop is generated.

In particular, by using the above method a transfer function of the difference signal (i.e. of the error signal) becomes zero at an operating frequency of a sensor to be controlled, i.e. the transfer function has a zero point at the operating frequency of the sensor. In particular, this operating frequency can be different from zero.

Further, a digital input signal may be converted into an analog control signal, and the conversion of the input signal may comprise a calculation of root.

The transfer function having a zero point at an operating frequency of the sensor may be generated by processing the difference signal (i.e. the error signal) and by feeding back the processed difference signal to the input signal, as is for example described above with respect to FIGS. 5A to 7F. In particular, the transfer function of the difference signal may satisfy one of the equations described above.

The invention claimed is:

1. A device for controlling a sensor, comprising
   a converter unit for converting an input signal into a control signal for controlling the sensor;
   a comparison unit for determining a difference signal that indicates the difference between the input signal and the control signal; and
   a control unit for controlling the input signal by means of the difference signal, wherein
   the control unit generates a transfer function of the difference signal by processing the difference signal and by feeding back the processed difference signal to the input signal;
   the transfer function of the difference signal has a zero point at an operating frequency of the sensor; and
   the operating frequency is different from zero.

2. The device according to claim 1, wherein the sensor is a capacitive micro-mechanical rotation rate sensor.

3. The device according to claim 1, wherein the sensor is operated in a bandpass band around its operating frequency.

4. The device according to claim 1, wherein the converter unit comprises a digital/analog converter, the input signal is a digital signal; and the control signal is an analog signal.

5. The device according to claim 1, wherein the converter unit performs based on the input signal a calculation of a root.

6. The device according to claim 1, wherein the transfer function of the difference signal satisfies the following equation: $G_E(z)=1-2z^{-1}\cos(\omega_0 T)+z^{-2}$ with $G_E(z)$ the transfer function of the difference signal, $z=e^{i\omega T}$, $\omega_0$ the operating angular frequency, T the sampling rate of the input signal and $\omega$ the angular frequency.

7. The device according to claim 1, wherein the transfer function of the difference signal is a function in at least the third power of $z^{-1}$, with $z=e^{i\omega T}$, T the sampling rate of the input signal, and $\omega$ the angular frequency.

8. A method for controlling a sensor comprising the steps:
   converting an input signal to a control signal for controlling the sensor;
   determining a difference signal that indicates the difference between the input signal and the control signal; and
   controlling the input signal by means of the difference signal, wherein
   controlling the input signal comprises generating a transfer function of the difference signal by processing the difference signal and by feeding back the processed difference signal to the input signal;
   the transfer function of the difference signal comprises a zero point at an operating frequency of the sensor; and
   the operating frequency is different from zero.

9. The method according to claim 8, wherein the input signal is a digital signal; and the control signal is an analog signal.

10. The method according to claim 8, wherein converting the input signal comprises a calculation of a root.

11. The method according to claim 8, wherein the transfer function of the difference signal satisfies the following equation: $G_E(z)=1-2z^{-1}\cos(\omega_0 T)+z^{-2}$ with $G_E(z)$ the transfer function of the difference signal, $z=e^{i\omega T}$, $\omega_0$ the operating angular frequency, T the sampling rate of the input signal and $\omega$ the angular frequency.

12. The method according to claim 8, wherein the transfer function of the difference signal is a function in at least the third power in $z^{-1}$, with $z=e^{i\omega T}$, T the sampling rate of the input signal, and $\omega$ the angular frequency.

* * * * *